(12) United States Patent
Xu et al.

(10) Patent No.: US 11,775,949 B2
(45) Date of Patent: *Oct. 3, 2023

(54) TRUSTED TRANSACTION SYSTEM FOR DIGITAL ASSET LICENSING

(71) Applicant: ADOBE INC., San Jose, CA (US)

(72) Inventors: Xuejun Xu, Cupertino, CA (US); Morgan David De Lossy, San Francisco, CA (US); Max Gray Edell, Ottawa (CA)

(73) Assignee: ADOBE INC., San Jose, CA (US)

(*) Notice: Subject to any disclaimer, the term of this patent is extended or adjusted under 35 U.S.C. 154(b) by 147 days.

This patent is subject to a terminal disclaimer.

(21) Appl. No.: 17/506,363

(22) Filed: Oct. 20, 2021

(65) Prior Publication Data

US 2022/0051211 A1 Feb. 17, 2022

Related U.S. Application Data

(63) Continuation of application No. 16/172,482, filed on Oct. 26, 2018, now Pat. No. 11,182,757.

(51) Int. Cl.
| | |
|---|---|
| *G06Q 20/12* | (2012.01) |
| *G06F 21/10* | (2013.01) |
| *G06Q 20/40* | (2012.01) |
| *H04L 9/06* | (2006.01) |
| *H04L 9/32* | (2006.01) |
| *H04L 9/00* | (2022.01) |

(Continued)

(52) U.S. Cl.
CPC ......... *G06Q 20/1235* (2013.01); *G06F 21/10* (2013.01); *G06Q 20/401* (2013.01);
(Continued)

(58) Field of Classification Search
CPC ............. G06Q 20/1235; G06Q 20/401; G06Q 20/0855; G06Q 20/02; G06Q 2220/00;
(Continued)

(56) References Cited

U.S. PATENT DOCUMENTS

| | | | |
|---|---|---|---|
| 2002/0144255 A1* | 10/2002 | Anderson | G06F 8/71 |
| | | | 717/174 |
| 2009/0287987 A1* | 11/2009 | Alles | G06Q 20/10 |
| | | | 705/1.1 |

(Continued)

OTHER PUBLICATIONS

"Copyright in Derivative Works and Compilations", Circular 14, United States Copyright Office, pp. 1-4, Jul. 22, 2020 (Year: 2020).*

(Continued)

*Primary Examiner* — James D Nigh
(74) *Attorney, Agent, or Firm* — SHOOK HARDY & BACON L.L.P.

(57) ABSTRACT

A licensing system and related methods are described utilizing aspects of distributed ledger technologies to facilitate trusted and verifiable licensing transactions for creative works. A client device can include an asset editing tool for incorporating an asset selected from a plurality of licensable assets into a new creative work. The selected asset can be downloaded for incorporation into the new creative work. The new creative work incorporating the selected asset can be analyzed to determine an amount that the selected asset contributed to the new creative work, or an amount that the new creative work is attributable to the selected asset. Based on the analysis, a smart contract associated with the new creative work can be generated to include license fees for licensing the new creative work, receive payment transactions for licensing the new creative work, and fairly disperse calculated portions of received payment transactions to a licensor of the new creative work and to another licensor of the incorporated selected asset.

20 Claims, 9 Drawing Sheets

(51) Int. Cl.
    *G06Q 20/08* (2012.01)
    *G06F 21/64* (2013.01)
    *G06Q 20/02* (2012.01)
    *H04L 9/40* (2022.01)

(52) U.S. Cl.
    CPC .......... H04L 9/0637 (2013.01); H04L 9/3236 (2013.01); H04L 9/3247 (2013.01); *G06F 2221/0768* (2013.01); *H04L 9/50* (2022.05); *H04L 2209/56* (2013.01); *H04L 2209/603* (2013.01)

(58) Field of Classification Search
    CPC .. G06F 21/10; G06F 21/64; G06F 2221/0768; H04L 9/0637; H04L 9/3236; H04L 9/3247; H04L 9/50; H04L 9/3239; H04L 2209/56; H04L 2209/603; H04L 2463/103; H04L 63/10
    USPC .......................................................... 705/59
    See application file for complete search history.

(56) References Cited

U.S. PATENT DOCUMENTS

| | | | | |
|---|---|---|---|---|
| 2018/0349572 | A1* | 12/2018 | Chen | G06F 16/00 |
| 2020/0110821 | A1* | 4/2020 | Chan | H04L 9/0637 |
| 2020/0294165 | A1* | 9/2020 | Yang | G06Q 50/184 |

OTHER PUBLICATIONS

"Orphan Works and Mass Digitization", U.S. Copyright Office, pp. 1-234, Jun. 2015 (Year: 2015).*

Leon, I.D. and Gupta, R., "The Impact of Digital Innovation and Blockchain on the Music Industry", Institutions for Development Sector, Competitiveness, Technology, and Innovation Division, Inter-American Development Bank, pp. 1-36, Nov. 2017 (Year: 2017).*

"Derivers Licenses: An Argument for Establishing a Statutory License for Derivative Works", Chicago-Kent Journal of Intellectual Property, pp. 1-21, 2006 (Year: 2006).*

"Copyright in Derivative Works and Compilations", Circular 14, United States Copyright Office, pp. 1-4 (Jul. 22, 2020).

"Orphan Works and Mass Digitization", U.S. Copyright Office, pp. 1-234 (Jun. 2015).

Leon, I. D., and Gupta, R., "The Impact of Digital Innovation and Blockchain on the Music Industry", Institutions for Development Sector, Competitiveness, Technology, and Innovation Division, Inter-American Development Bank, pp. 1-36 (Nov. 2017).

Morrison, R. J., "Deriver's Licenses: An Argument for Establishing a Statutory License for Derivative Works", Chicago-Kent Journal of Intellectual Property, pp. 1-21 (2006).

* cited by examiner

TRUSTED TRANSACTION SYSTEM FOR DIGITAL ASSET LICENSING

CROSS-REFERENCE TO RELATED APPLICATIONS

This application is a continuation of U.S. patent application Ser. No. 16/172,482, filed Oct. 26, 2018, and entitled "TRUSTED TRANSACTION SYSTEM FOR DIGITAL ASSET LICENSING", the contents of which is incorporated by reference in its entirety herein.

BACKGROUND

Digital works of creative, artistic, or commercial value are often used, in whole or in part, by entities other than the creator for various purposes. For example, the advertising industry, such as marketing companies, media services, and advertising agencies, oftentimes create original or collaborative works that include digital assets licensed from others. Generally, an advertiser or creative artist must obtain a license for an asset from a licensor before a creative work incorporating the licensable asset is used for commercial purposes. While some asset-editing applications provide portals for the creative artist to access licensable assets and pay for the incorporation of these assets into new works, there are certain limitations to existing licensing models that deter the creative artist from incorporating licensable assets into their creative works. For instance, creative artists are generally unable to create prototype creative works without first paying license fees for other's assets. Further, after an asset has been licensed, and the creative artist discovers a need for a different resolution or alternate configuration of the licensed asset, the creative artist may discover that additional, undesirable license fees are required to obtain the alternative asset. Simply put, the potential costs involved in licensing assets for incorporation into a new or collaborative work can be undesirably high.

SUMMARY

A high-level overview of various aspects of the technology described herein is provided as an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

Embodiments of the present invention relate to a license fee determination and payment system. More specifically, the disclosed systems and methods employ aspects of distributed ledger technologies to provide a trusted and transparent asset licensing framework for determining license fees for assets employed in collaborative works, whereby the licensing framework facilitates automated determination of license fee payments and the recording of such payments to a transparent and immutable distributed ledger. In some embodiments, creative artists can freely incorporate unlicensed but licensable assets, such as digital stock images or videos, into creative works until a time the creative work is finalized for publication. In this way, creative artists can generate creative works including unlicensed assets without concern of wasted costs.

In some further embodiments, a license fee for a licensable asset incorporated into a creative work can be dynamically calculated, such that the calculated license fee corresponds to an amount of attribution that a licensable asset is due based on its dynamically-determined contribution to a creative work. As such, an automated and accurate method for calculating a percentage of contribution to a creative work can facilitate a cost-effective way to dynamically calculate a license fee for authorized use of a licensable asset. Utilizing various embodiments described herein, payments of royalties (i.e., license fees) can also be dynamically distributed to licensors based on a dynamically-calculated percentage of contribution to other creative works.

BRIEF DESCRIPTION OF THE DRAWINGS

Illustrative embodiments of the present invention are described in detail below with reference to the attached drawing figures, and wherein.

DETAILED DESCRIPTION

Figure 1:
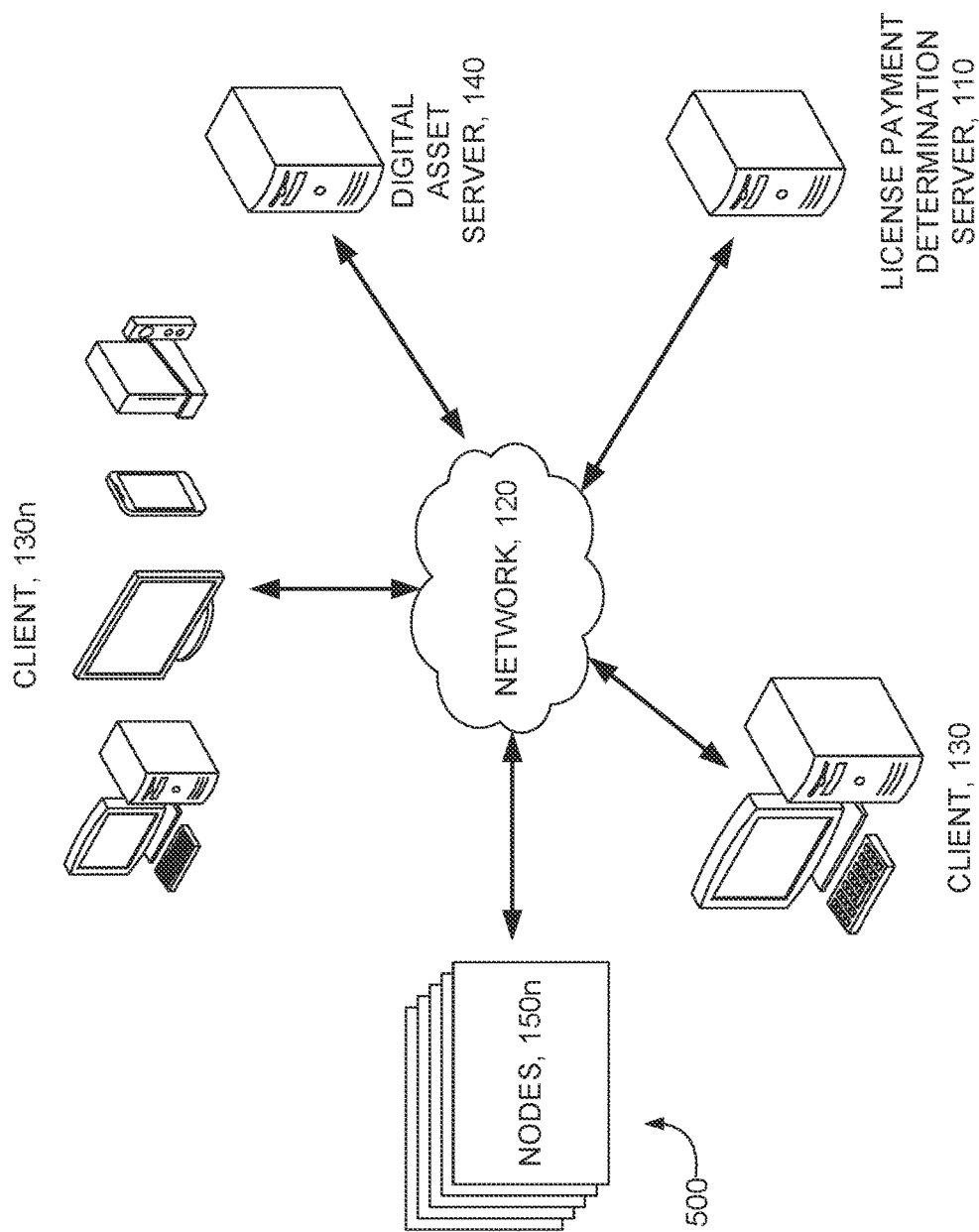
FIG. 1 is an exemplary system diagram in accordance with some embodiments of the present invention.

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of the methods employed, the terms should not be interpreted as implying any particular order among or between various steps herein disclosed unless and except when the order of individual steps is explicitly described. Additionally, although the singular or plural form of terms may be used herein, the use of the singular/plural should not be interpreted as excluding the plural/singular unless and except explicitly stated.

Conventional asset licensing models generally make it difficult for a creative artist (also referenced herein as "user") to incorporate a licensable asset into a creative work without first taking out (e.g., paying for) a license on the licensable asset. A relevant factor in the restrictive nature of conventional asset licensing workflows revolves around the idea of trust. Providers of asset licensing services are restricted, generally by contractual agreement, from distributing licensable assets without first collecting a license fee for payment to a licensor of the asset. The inherent ease for one to download and distribute an unlicensed asset onto the Internet makes it difficult for a licensor to collect license fees for their creative contributions to a creative work. Further, it can be difficult for the licensor to determine whether a creative work, incorporating the licensor's asset, has properly taken out a license for use of the asset, particularly if a creator of the creative work is unknown. As such, providers of asset licensing services typically limit accessibility to licensable assets by providing low-resolution (e.g., thumbnails) or watermarked versions, so that potential licensees cannot simply download and utilize the asset without first making a license fee payment to the licensor.

Asset licensing services generally make stock photos or other similar licensable assets available for view on stock photo websites. As an added feature, some creative asset design and editing applications incorporate tools that facilitate the browsing, selection, and incorporation of licensable assets into creative works. For instance, an asset editing application can include a stock image browser that enables a user to search licensable assets, select a desired licensable asset, and pay the associated license fee to take out a license on the asset for incorporation into a new creative work. However, these tools and the licensing structure on which they are made available are oftentimes viewed by creative artists as undesirable or unfair.

For instance, creative artists are generally unable to create prototype creative works (e.g., rough drafts) that incorporate licensable assets without first paying the license fees for the licensable assets. Moreover, once an asset has been formally licensed (e.g., paid for), a creative artist may later discover a need for alternative resolutions or configurations (e.g., slightly rotated versions) of the licensed asset. In this regard, the creative artist may unfortunately discover that additional license fees are required to access the alternatives due to the restrictive nature of conventional stock image service implementations.

In another instance, creative artists may want to incorporate only a portion of a licensable asset into a creative work. A creative artist may wish to utilize facial features of a model whose entire body is the subject of a stock photo offering. In this regard, the creative artist may find it unreasonable to pay a license fee for the entire stock photo, particularly when only a small portion of the subject model in the stock photo is being incorporated into the creative work. Similarly, the creative artist may wish to utilize the entire body of the model depicted in the stock photo offering, whereby the depicted subject model is shrunk down to a very small size occupying only a small area of the creative work. In this regard, the creative artist may also find it unreasonable to pay the license fee for the entire stock photo, when only a small portion of the creative work is attributable to the licensable asset.

Conventional asset licensing systems generally do not enable licensors of assets to be compensated for licensed use of their asset on an attribution-specific basis, or in other words, based on a percentage of contribution that their asset has to a new creative work. Such a licensing model could be beneficial to licensors and licensees alike, particularly if the prospect for increasing revenue is made available to the licensor, while a realization of savings is made available to the creative artist.

Provided the foregoing, an asset licensing system is described herein, utilizing aspects of a distributed ledger (e.g., a blockchain) to autonomously determine license fees for digital assets based on their contribution to creative works, to autonomously distribute license fees based on the determined license fees, and to autonomously maintain immutable records of determined and paid license fees for authorized use of the digital assets. Utilizing an asset editing tool, such as such as Adobe Photoshop® developed by Adobe, Inc. of San Jose, Calif., having asset licensing features (e.g., a stock asset browser) such as Adobe Stock®, a user of a client device can employ the asset editing tool to incorporate one or more licensable assets into a creative work without first paying a license fee for each licensable asset as required by conventional systems. Further, the user can request that a license fee for an incorporated licensable asset be determined based on its contribution to the creative work. As an added benefit, the user can publish the creative work without payment of any licensing fees, such that others can license the new creative work, and a share of a paid license fee for the new creative work, dynamically-determined based on a licensable asset's contribution to the creative work, can be accordingly dispersed to a licensor of the licensable asset incorporated in the creative work.

In various embodiments, a user can select a licensable asset from a data repository to incorporate the licensable asset or portions thereof into a creative work. When the user is satisfied with the creative work and has determined that it is ready for publication, the user can generate a request to publish the creative work. The generated request, including the creative work among other things, can be communicated to the data repository for storage thereby. The data repository can employ a license payment determination server to analyze the creative work and determine, based on the analysis, a "ratio of contribution" for the incorporated licensable asset included in the creative work. In other words, a determined ratio of contribution generally defines a proportion or percentage of the licensable asset's contribution to the creative work and/or a proportion or percentage of the creative work that can be attributed to the licensable asset.

In some embodiments, a new creative work that includes a portion of a licensable asset selected from a plurality of licensable assets is generated by a computing device. The generated creative work is communicated to a remote server configured to generate a smart contract that defines the license fee for the generated creative work. In some aspects, the license fee is based on a comparison of the creative work to the selected asset. Additionally, in some aspects, the license fee for the creative work is based on a previously-generated smart contract corresponding to the selected asset, whereby the previously-generated smart contract defines a license fee for the selected asset. In some aspects, the previously-generated smart contract is stored on a distributed ledger. As such, in some aspects, the generated smart contract includes a license fee that is calculated for the creative work, in addition to determined percentages, portions, or values of the license fee that will be dispersed to licensor(s) of other licensable assets incorporated in the creative work.

The generated smart contract corresponding to the creative work is communicated to the nodes and stored to the distributed ledger maintained by the plurality of nodes (e.g., computing devices), whereby the smart contract is employed to receive and disperse license fee payments to licensor(s) associated with the creative work. When a payment transaction to license the asset is received via the distributed ledger by referencing the stored smart contract, the payment transaction is recorded on the distributed ledger and referenced as proof that the license fee was paid.

In some embodiments, a licensable creative work stored in a data repository is licensed by other users (e.g., via respective client devices) before a license fee is paid for a licensable asset included in the creative work. Thus, if a licensable asset includes another licensable asset, the nodes employ the smart contract associated with the licensable asset to receive and disperse a portion of the paid license fee to a licensor of the other licensable asset included in (e.g., having contributed to) the licensable asset for which the license fee was paid. In other words, a license fee paid for taking out a license on a licensable asset is divided up and dispersed accordingly by the nodes based on a ratio of contribution determined for each licensable asset incorporated into a licensable asset for which the license fee was paid. As multiple licensable assets can be incorporated into a single licensable asset, in some aspects, a smart contract generated for a single licensable asset includes a licensing fee for each licensable asset incorporated into the single licensable asset.

In some embodiments, the client device monitors the distributed ledger to determine that a license fee for a generated creative work has been calculated and stored on the distributed ledger. In response, the client device generates a notification for display including the calculated license fee based on a determination that the calculated license fee is stored on the distributed ledger. In some embodiments, the client device also facilitates payment (e.g., generate a payment transaction) of the calculated license fee, so that a record of the payment is stored as an immutable record in association with the creative work and the licensable asset upon completion of the payment.

Various terms are used throughout, some of which are described below:

As used herein, an "asset" refers to a digital document, photograph, image, text, video, audio, or similar file of any electronic format.

A "fee" refers to a monetary value, which can be defined in a fiat currency (e.g., the U.S. Dollar) or a cryptocurrency (e.g., Bitcoin, Ethereum).

A "licensable asset" refers to any asset that a licensor has made available for licensing. A licensable asset can be provided via a stock asset licensing service, such as a stock image website or repository, among other places. In some aspects, a licensable asset can include one or more other licensable assets.

A "limited version asset" refers to licensable asset that a creative artist or "user" has selected for incorporation into a creative work. In some embodiments described herein, a limited version asset can include a lower-resolution and/or watermarked copy of a selected licensable asset.

A "licensed asset" refers to a licensable asset whereby a creative artist or third party has paid a license fee to have authorized use of the asset. In some embodiments described herein, a licensed asset can include a high-resolution and/or non-watermarked copy of the licensable asset. In some aspects, a licensable asset or limited version thereof can be converted to a licensed asset based on a determination that the license fee has been paid.

A "new asset" or a "creative work" is an asset that incorporates any portion of another licensable asset. A new asset or creative work can be generated by a user via an asset editing application installed on a client device associated with the user. The user can be a licensor of the new asset or creative work, but may not have a license for licensable assets incorporated into the new asset or creative work. In this regard, payments of license fees for the creative work should be paid in part to the licensor of the new asset or creative work, in addition to licensor(s) of licensable assets incorporated into the new asset or creative work.

An "asset identifier" or "asset ID" can include a unique identifier that is associated with an asset. A reference to an asset identifier can be employed to easily identify, search for, or refer to an associated asset. In some embodiments, a hash of an asset can be generated and utilized as the asset identifier. As an asset can go through various stages (e.g., creation, publication, remote storage, transfer), the asset identifier can remain constant throughout, and may also be referred to herein as a creative work ID, a licensable asset ID, an unlicensed asset ID, a licensed asset ID, and the like.

A "ratio of contribution" refers to a determined value(s) that represents how much of a licensable asset incorporated into a creative work should be attributed to the incorporated licensable asset, or in other words, how much of the incorporated licensable asset has contributed to the creative work. The ratio of contribution can include a count, a percentage, a scalar value, or any combination thereof. By way of non-limiting example, content (e.g., pixels, groups of pixels, objects, and/or layers) of a licensable asset can be compared to those of a creative work. The ratio of contribution can correspond to a determined percentage of the licensable asset's content included in the creative work. Additionally, or alternatively, the ratio of contribution can include a percentage of the creative work's content that can be attributed to the licensable asset. Various techniques for comparing asset content can be employed within the purview of the present disclosure. By way of non-limiting example, hashes (e.g., perceptual hash or "pHash") of one or more portions of assets, or content included in the assets, can be generated to facilitate comparisons or determine ratios of contribution there between.

A "smart contract" is a self-executing set of code, typically written in a Turing-complete programming language (e.g., Solidity employed by the Ethereum blockchain). A smart contract includes code that is stored on a blockchain, and can be employed by the nodes to execute a set of operations based on one or more conditions being determined met by the nodes. In various embodiments, a condition can include a receipt or storage of a particular transaction and/or parameters on the blockchain via the nodes, a digital signature being associated with a particular transaction, a particular transaction referencing the smart contract, and/or any combination thereof, among other things. The set of operations can include calculation of a license fee for one or more licensable assets, a dispersion or release of one or more portions of a license fee for one or more licensable assets, a change of state or a flag for association with one or more licensable assets, and/or any combination thereof.

Turning now to FIG. 1, a schematic depiction is provided illustrating an exemplary system diagram of a distributed ledger license payment network 100 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, software, or a combination thereof. For instance, various functions may be carried out by a processor executing instructions stored in memory.

The distributed ledger license payment network 100 depicted in FIG. 1 includes a license payment determination server 110 that is in communication with a network 120, such as the Internet. The system includes client devices 130, 130n, digital asset server 140, and a distributed plurality of nodes 150n that are also in communication with the network 120. Among other things, the client devices 130, 130n can communicate, directly or indirectly, with the license payment determination server 110. By way of example, the client device 130 can select a licensable asset from a plurality of licensable assets provided by assert server 140 to include into a creative work being generated on client device 130. The digital asset server 140 can provide the selected asset (i.e., licensable asset) to the client device 130 based on the selection so that the client device 130 can generate the creative work incorporating any portion of the selected licensable asset. In some aspects, the digital asset server 140 can provide a limited version asset associated with the selected licensable asset based on the selection so that the client device 130 can generate the creative work incorporating any portion of the provided limited version asset. In some aspects, the asset server 140 and the license payment determination server 110 can be the same server.

When the user decides that a creative work is ready for publication, a user input indicating a desire to publish (e.g., complete) the creative work can cause a request to be generated by the client device 130 for transmission to the digital asset server 140. A creative work can be published, or in other words made available by the digital asset server 140, as a licensable asset, for licensing, print, storage, incorporation by other creative works, use in a web-advertisement, or for distribution, among other things. The generated request can include, among other things, the generated creative work, an associated creative work identifier, one or more licensable asset identifiers that are each associated with a licensable asset incorporated into the generated creative work, or any combination thereof. It is contemplated that a creative work can include one or more licensable assets in accordance with various embodiments described herein, and as such, one or more licensable asset identifiers each associated with an incorporated licensable asset can be included in the generated request.

Based on receiving the generated request, the digital asset server 140 can store the creative work included in the request, and forward at least a portion of the received request to a license payment determination server 110. The license payment determination server 110 can employ the included licensable asset identifier(s) to retrieve the associated asset(s) incorporated into the creative work. In various embodiments, the license payment determination server 110 can analyze and/or compare the creative work and the retrieved associated asset(s) to determine a ratio of contribution for each licensable asset incorporated into the creative work. To analyze and/or compare a creative work and a licensable asset incorporated in the creative work, the license payment determination server 110 can employ a variety of image processing techniques, such as perceptual hashing, machine learning, object detection, content extraction, or any other technique for comparing the creative work and the incorporated licensable asset, or content depicted each therein, to determine a ratio of contribution for association with the incorporated licensable asset.

The license payment determination server 110 can also generate, for any or each licensable asset stored on digital asset server 140, a smart contract for storage on a distributed ledger maintained by nodes 150n of a distributed ledger network 500. A smart contract associated with a licensable asset can be generated by license payment determination server 110 based on the licensable asset being stored on digital asset server 140 and/or the ratio(s) of contribution being determined for incorporated licensable asset(s) included in the stored licensable asset, among other things. A smart contract associated with a licensable asset can be generated by license payment determination server 110 for licensable assets being entirely original (e.g., incorporating no other licensable assets) or for licensable assets incorporating one or more other licensable assets. In this regard, a smart contract associated with an original licensable asset can include operations that, based on a payment transaction for licensing the original licensable asset being detected by nodes employing the smart contract, disperse all (e.g., 100%) of the paid license fee to a licensor of the original licensable asset. On the other hand, a smart contract associated with a licensable asset incorporating other licensable asset(s) can include operations that, based on a payment transaction for licensing the licensable asset being detected by nodes employing the smart contract, disperse a portion of the paid license fee to a licensor of the licensable asset, and other portion(s) of the paid license fee to other licensor(s) of incorporated licensable asset(s). The operations of a smart contract associated with a licensable asset can be automatically programmed by license payment determination server 110 based on zero or more ratio(s) of contribution determined for the licensable asset, among other things. In other words, an entirely original asset having no incorporated licensable or licensed assets can be associated with a smart contract having zero ratio of contribution. A creative work, on the other hand, having one or more incorporated licensable or licensed assets can be associated with a smart contract having one or more ratio(s) of contribution, each ratio of contribution being determined for one of the incorporated licensable assets.

A smart contract in accordance with various embodiments described herein can be associated with a licensable asset stored on digital asset server 140 and can include definable fields (e.g., licensor-defined base license fee, variable defined fee for different ratios of contribution, licensor payment address(es)) associated with the stored licensable asset, among other things. In some embodiments, the license payment determination server 110 can generate a smart contract associated with a creative work based on a creative work or a licensable asset stored on digital asset server 140 being communicated thereto. In this regard, a creative work, once communicated to license payment determination server 110, can become a licensable asset, such that a smart contract is generated for the creative work, and the creative work (and incorporated licensable assets) can be licensed to a licensee based on a payment transaction addressed to the smart contract from an address of the licensee being stored on the distributed ledger. As discussed in more detail below, a smart contract can be generated based on a Turing-complete programming language, such as Solidity or any other suitable programming language. A smart contract associated with a licensable asset can be generated to include any of an associated licensable asset identifier, an associated smart contract address for receiving license fee payments, a set of licensor payment addresses associated with other licensable assets incorporated into the licensable asset for dispersing portion(s) of received license fee payments, a set of determined ratios of distribution for other licensable assets incorporated into the licensable asset for calculating license fees and/or portion(s) to be dispersed, a set of other smart contract addresses associated with other licensable assets incorporated into the licensable asset for referencing parameters of the other licensable assets' smart contracts, and/or metadata associated with the licensable asset, among other things.

In some embodiments, a client device 130 may further generate a request for a license fee to be calculated for licensing a licensable asset generally, or for licensing one that is incorporated into a creative work (e.g., stored by digital asset server 140) generated by the client device 130. In this regard, the generated request for the license fee can include a licensable asset identifier associated with a licensable asset or an incorporated licensable asset for which the license fee is requested. In some other embodiments, a calculated license fee can be automatically provided to the client device 130 based on the ratio of contribution being determined for the licensable asset incorporated in the generated creative work. As previously noted, as a generated creative work can include one or more licensable assets, a license fee can be requested by and/or provided to client device 130 for each licensable asset incorporated into a generated creative work.

In some embodiments, the generated request can be processed locally by the client device 130, communicated to the digital asset server 140 for processing, or communicated to the license payment determination server 110 for processing. Processing a request to calculate a license fee for licensing a licensable asset can include parsing the distributed ledger for stored transactions that reference the licensable asset identifier associated with the licensable asset. In some aspects, the distributed ledger can be parsed to further identify a smart contract associated with the licensable asset. A license fee for licensing an asset can be stored in an associated smart contract stored on the distributed ledger, whereby the stored license fee can include all other license fees associated with incorporated licensable assets, if applicable. If the client device 130 generates a request for the license fee for a licensable asset incorporated into a creative work generated by the client device 130, the client device 130 can parse the distributed ledger to identify the smart contract associated with the generated creative work identifier. The identified smart contract, associated with the generated creative work identifier, can include therein a base license fee for the generated creative work, the determined ratio of contribution for each incorporated licensable asset, and a license fee that is or can be calculated for each incorporated licensable asset based on the determined ratio of contribution, among other things. In some aspects, the base license fee can be defined by a creator or licensor of a generated creative work when the generated creative work is published via the client device 130. In some other aspects, the base license fee can be automatically determined based at least in part by the license fee(s) calculated for incorporated licensable assets included in the generated creative work. In this way, any one of the client device 130, digital asset server 140, or license payment determination server 110 can calculate and/or determine, from the smart contract associated with the generated creative work, a license fee for each incorporated licensable asset included in the generated creative work.

In some aspects, if the client device 130 is the client device on which a creative work including a licensable asset was generated, the client device 130 can determine that only the incorporated licensable assets need to be licensed by the client device 130, and a license fee calculated for portions of the generated creative work, not attributable to incorporated licensable assets, can be subtracted from the base license fee defined in the associated smart contract. In this way, a user of the client device 130 responsible for generating the creative work incorporating other licensable assets need only pay for license fees calculated for the incorporated licensable assets.

In some embodiments, the client device 130 can provide for display the license fee calculated for a licensable asset included in a generated creative work, and in further embodiments, provide an option for the client device 130 to remit payment corresponding to the calculated license fee. The client device 130 can include a distributed ledger "wallet," which can generate payment transactions to transfer value (e.g., a cryptocurrency amount) to any smart contract associated with a licensable asset. A generated payment transaction can be communicated from the client device 130 to any one of the nodes 150$n$ maintaining the distributed ledger, so that the generated payment transaction can be verified by the nodes 150$n$ and stored on the distributed ledger.

A record of payment corresponding to a paid license fee for a licensable asset can be stored to the distributed ledger by the nodes 150$n$ of the distributed ledger network 500 based on the client device 130 having generated a transaction of payment directed to a smart contract associated with the licensable asset. In some embodiments, based on a determination that a payment transaction for licensing a licensable asset is stored on the distributed ledger, any one of the client device 130, digital asset server 140, or license payment determination server 110 can determine that a license has been acquired for authorized use of the licensable asset.

Figure 2:
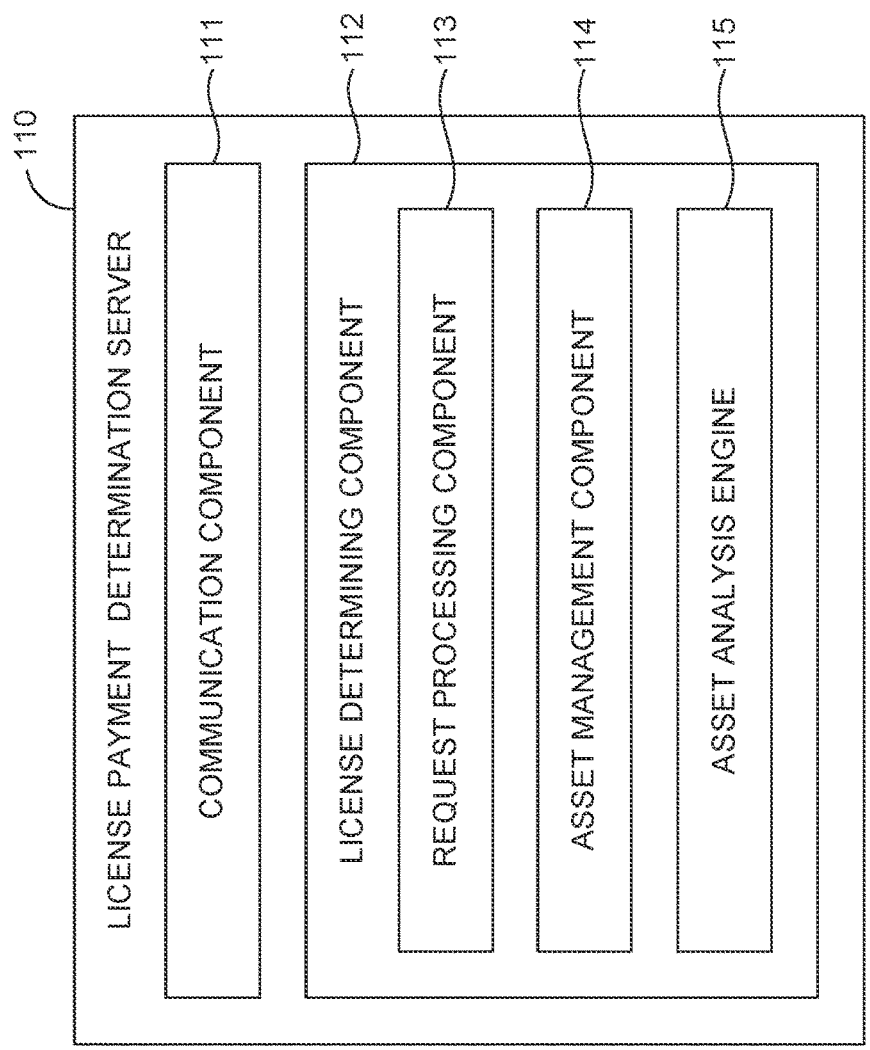
FIG. 2 is a block diagram depicting an exemplary license payment determination server in accordance with some embodiments of the present invention.

Turning now to FIG. 2, a block diagram of an exemplary license payment determination server 110 is depicted in accordance with some embodiments described herein. Generally, the license payment determination server 110 analyzes or compares assets included or referenced in a request to publish a generated creative work communicated from a client device, such as client device 130, to an asset server, such as digital asset server 140 of FIG. 1. In some embodiments, license payment determination server 110 can include a communication component 111 and a license determining component 112. Communication component 111 can include any type of communication device that enables the license payment determination server 110 to communicate with the asset server, the client device, or nodes of a distributed ledger network collectively maintaining a distributed ledger, such as nodes 150$n$ of FIG. 1.

The license determining component 112 identifies, retrieves, and analyzes or compares assets based on received requests to publish and any creative works or asset identifiers included therein. The license determining component 112 can include a request processing component 113, an asset management component 114, and an asset analysis engine 115. The request processing component 113 can parse one or more licensable asset identifiers included in a request received from the asset server. The asset management component 114 can retrieve one or more licensable assets from the asset server based on licensable asset identifiers parsed from the request received from the asset server. A licensable asset can be retrieved from the asset server by querying the asset server for a licensable asset associated with a licensable asset identifier included in the received request. It is contemplated that the retrieved licensable asset can include a full resolution or non-watermarked version of the licensable asset.

The asset analysis engine 115 can analyze and compare one or more licensable assets to determine a ratio of contribution for association with a licensable asset incorporated in another licensable asset (e.g., a creative work). The asset analysis engine 115 can employ a variety of image processing techniques, including perceptual hashing, machine learning, text analysis, content or context extraction, or the like, for comparing the licensable assets and the content depicted thereby. By way of non-limiting example, hashes of the pixels, groups of pixels, identified objects, and/or layers of different licensable assets (e.g., a creative work and an unlicensed asset incorporated therein) can be compared to determine an amount or percentage that a licensable asset incorporated into a creative work contributes to the creative work. Among other things, the determined amount or percentage of contribution corresponds to a ratio of contribution determined for the licensable asset incorporated into the creative work. A determined ratio of contribution can be represented as a count, a percentage, a ratio, a scalar value, or any combination thereof.

In some embodiments, the asset analysis engine 115 can determine one or more ratios of contribution for licensable asset(s) included in a creative work, to generate a smart contract for association with the creative work. A smart contract associated with a creative work can be generated to include one or more defined values, such as a base license fee for licensing the creative work. The smart contract can also be generated to include one or more dynamically calculated values, such as a license fee calculated for each licensable asset incorporated in the creative work, whereby the license fee is calculated based on the ratio of contribution determined for the incorporated licensable asset. In some embodiments, the asset analysis engine 115 can parse the distributed ledger or query the asset server to determine other fields that can be defined in the smart contract, such as smart contract addresses for each incorporated licensable asset, payment addresses for each licensor associated with an incorporated licensable asset, or any other metadata that is associated with the creative work and/or licensable assets incorporated therein. A smart contract generated for a creative work can be communicated by license payment determination server 110 to any node, such as node 150n, of the distributed ledger network for storage on the distributed ledger. In this way, a record for each licensable asset and incorporated licensable assets can be stored, monitored, and maintained via the distributed ledger maintained by the nodes.

Figure 3:
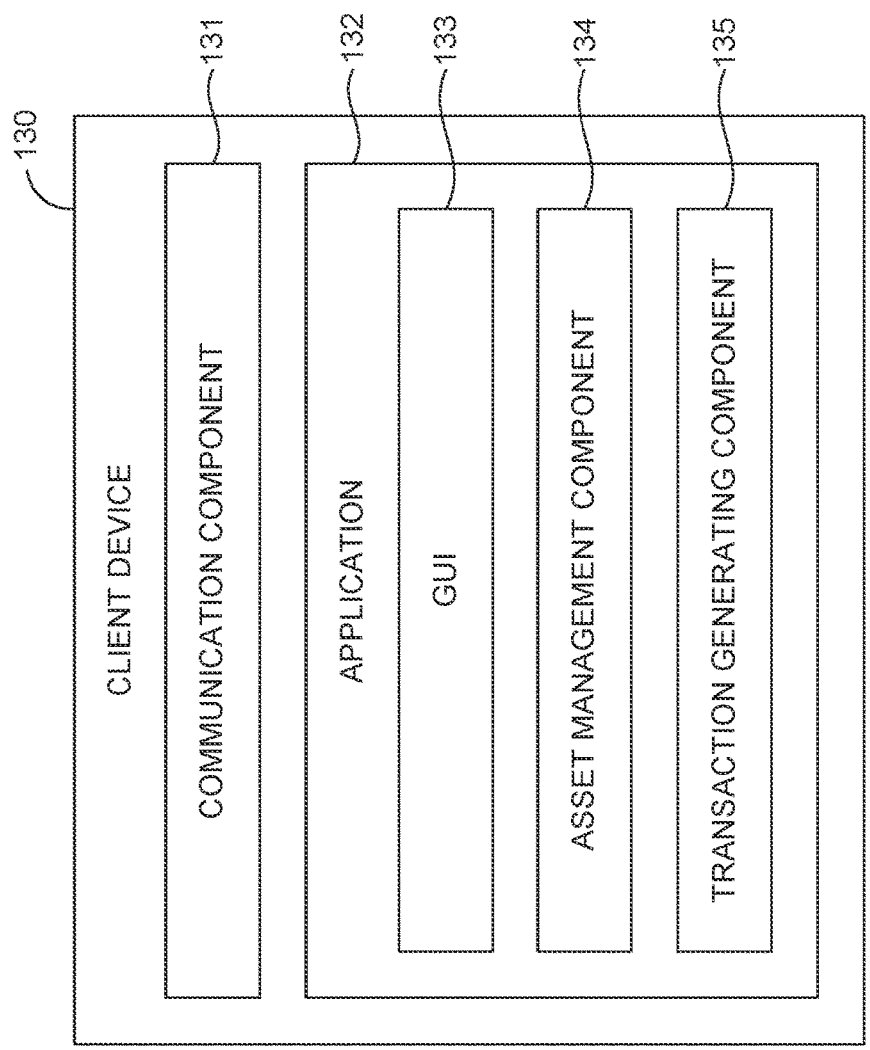
FIG. 3 is a block diagram depicting an exemplary client device in accordance with some embodiments of the present invention.

Turning now to FIG. 3, a block diagram of an exemplary client device 130, such as client device 130 of FIG. 1, is depicted in accordance with some embodiments described herein. The client device 130 can include a communications component 131 that enables the client device 130 to communicate with a license payment determination server, such as license payment determination server 110 of FIG. 1, an asset server such as digital asset server 140 of FIG. 1, or nodes of a distributed ledger network such as nodes 150n of FIG. 1. The client device 130 can also include an application 132 that facilitates the generation of creative works or "new assets." Application 132 can include a graphical user interface (GUI) 133, an asset management component 134, and a transaction generating component 135, among other things. By way of non-limiting example, application 132 can include an asset editing application such as Adobe® Photoshop®, Adobe® Illustrator®, Adobe® Premiere®, Adobe® Lightroom®, or the like. Application 132 can be locally stored, remotely stored, or accessible to client device 130 via a cloud based application or service. The GUI 133 of application 132 can enable users to generate and edit new assets, whether original or incorporating other licensable assets.

Application 132 can also include an asset management component 134. The asset management component 134 can access and retrieve licensable assets and associated metadata stored by an asset server, such as digital asset server 140 of FIG. 1, for incorporating the licensable assets into a new asset being generated via the application 132. For example, a user can open a query option in the GUI 133 to enter search parameters to conduct a licensable asset search. The search parameters can include keywords, subjects, licensable asset identifiers, licensors, creators, payment addresses of licensors, smart contract addresses, or the like. Asset management component 134 can communicate the search parameters to the asset server to initiate a query for licensable assets that the asset server determines relevant to the communicated search parameters. The GUI 133 can provide for display the determined relevant licensable assets, and receive a selection that corresponds to one of a plurality of licensable assets in the displayed determined relevant licensable assets. The selection can cause the client device 130 to retrieve (e.g., based on the asset server responsively sending) the selected licensable asset (or a limited version asset associated therewith). The selection can further cause the client device 130 to retrieve any of a licensable asset identifier associated with the selected licensable asset, an address of a smart contract associated with the selected licensable asset, metadata associated with the selected licensable asset, or a base license fee defined for the selected licensable asset, among other things. The application 132 can be employed to incorporate the retrieved licensable asset(s) (or associated limited version assets) into a creative work being generated via the application 132. As noted herein, it is contemplated that a creative work can include a plurality of licensable assets, and as such, a plurality of licensable assets can be selected and retrieved for incorporation into the creative work being generated via application 132.

In some embodiments, the asset management component 134 can generate an asset identifier for a creative work generated via application 132. In some embodiments, the asset management component 134 can generate a hash based on the creative work, such that the generated hash can be employed as the creative work's asset identifier. By way of example, a user can employ application 132 to generate a creative work, which can include a portion of a retrieved licensable asset. The application 132 can receive a publish command or corresponding user input so that the asset management component 134 can generate a creative work identifier (e.g., generate a hash of the creative work) for association with the generated creative work. The client device 130 can communicate, among other things, the generated creative work and the generated creative work identifier associated therewith to the asset server for storage in an asset database, such as asset database 141 of FIG. 1. In some further embodiments, if the generated creative work includes a licensable asset, generated creative work, the generated creative work identifier, and the licensable asset identifier associated with the incorporated licensable asset can be communicated to the asset server for storage in the asset database. In some further embodiments, if the generated creative work includes the licensable asset and thus the licensable asset identifier is in fact communicated with the generated creative work identifier, the asset management component 134 can also request that a license fee for licensing the incorporated licensable asset be calculated and presented via the GUI 133.

In some embodiments, the application 132 can include a transaction generating component 135 that can generate payment transactions for communication to any node of a distributed ledger network, such as node 150*n* of distributed ledger network 500 depicted in FIG. 1. A payment transaction can include, among other things, a payment of a calculated license fee for licensing a licensable asset, whether the licensable asset is being licensed independently or as a contribution to another licensable asset in which the licensable asset is incorporated, such as a creative work generated via the application 132. The transaction generating component 135 can generate a payment transaction, addressed to a smart contract associated with one of the licensable asset or the creative work incorporating the licensable asset, for communication to at least one node of the distributed ledger network. The payment transaction can be generated and communicated to a node, which can verify the payment transaction with all nodes of the distributed ledger network, disperse the payment transaction to licensor(s) in accordance with the terms or operations defined in the addressed smart contract, and store the dispersed payment transaction as one or more immutable records onto the distributed ledger. In various embodiments, transaction generating component 135 can include a distributed ledger token or cryptocurrency "wallet," as one of ordinary skill in the art may appreciate. Among other things, the transaction generating component 135 can monitor a distributed ledger to track transactions referencing a public key associated with a private key stored on the client computing device 130, or track transactions referencing a creative work identifier and/or licensable asset identifier, among other things. In some embodiments, the transaction generating 135 component can digitally sign transactions, generated by transaction generating component 135, with the private key of the client computing device 130 for authenticating the transaction.

Figure 4:
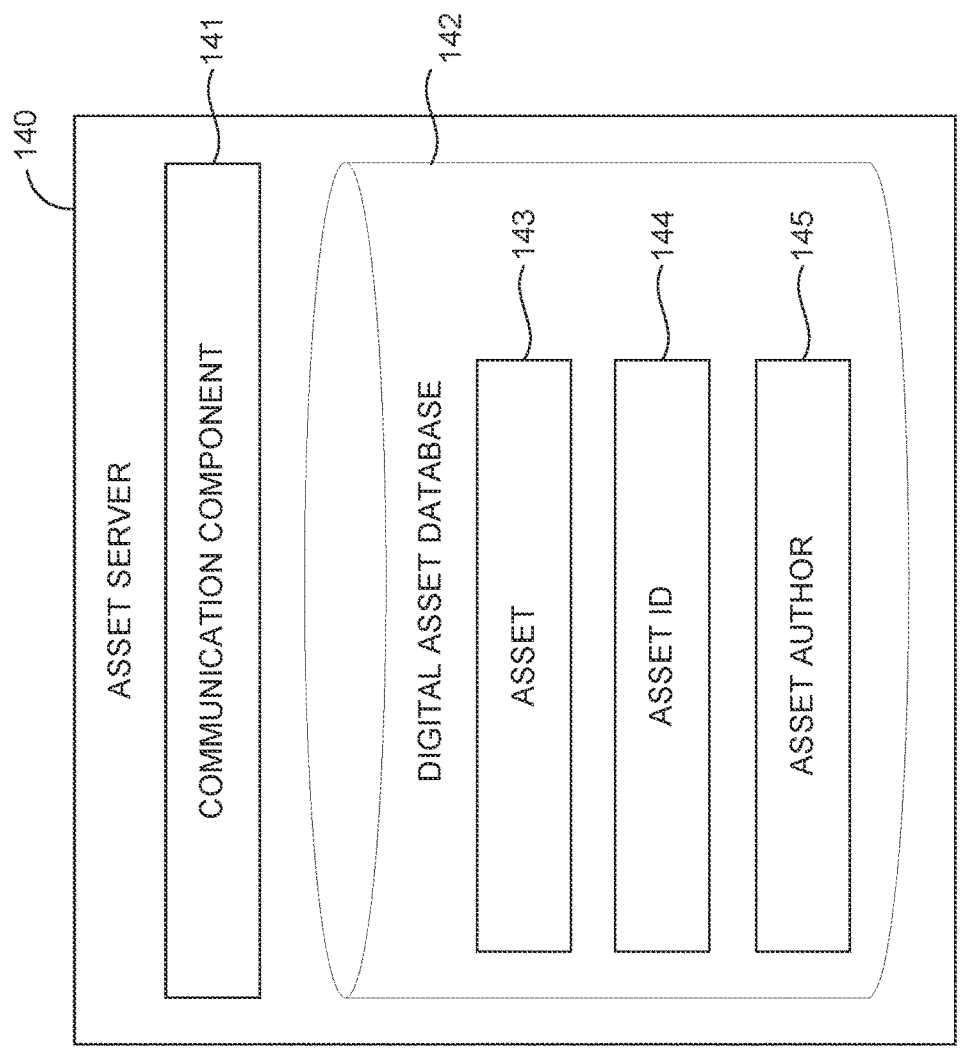
FIG. 4 is a block diagram depicting an exemplary asset server in accordance with some embodiments of the present invention.

Turning now to FIG. 4, a block diagram of an exemplary digital asset server 140 (i.e., a data repository) is depicted in accordance with some embodiments described herein. Digital asset server 140 can store licensable assets and associated metadata in one or more asset databases, such as asset database 141. For example, in some embodiments, digital asset server 140 can store a plurality of licensable assets 142 and associated metadata, such as a licensable asset identifier 143, an author 144 associated with the licensable asset, keywords or tags associated with the licensable asset, an address of a smart contract associated with the licensable asset, or any combination thereof. An author 144 can include the name, unique identifier, pseudonym (such as an account name), public key (e.g., payment or "wallet" address), and/or other information employable to identify the person or entity credited with creating the licensable asset. In some further embodiments, metadata associated with a stored asset can further include licensable asset identifiers for incorporated licensable assets, or in other words, licensable asset identifiers associated with other licensable assets incorporated into a licensable asset stored by digital asset server 140. Additionally, in some embodiments, asset database 141 can generate and/or store a limited version asset associated with a stored licensable asset, which can include a low resolution version and/or a watermarked version of the stored licensable asset. In some aspects, the asset server 140 and the license payment determination server 110 can be the same server.

Figure 5:
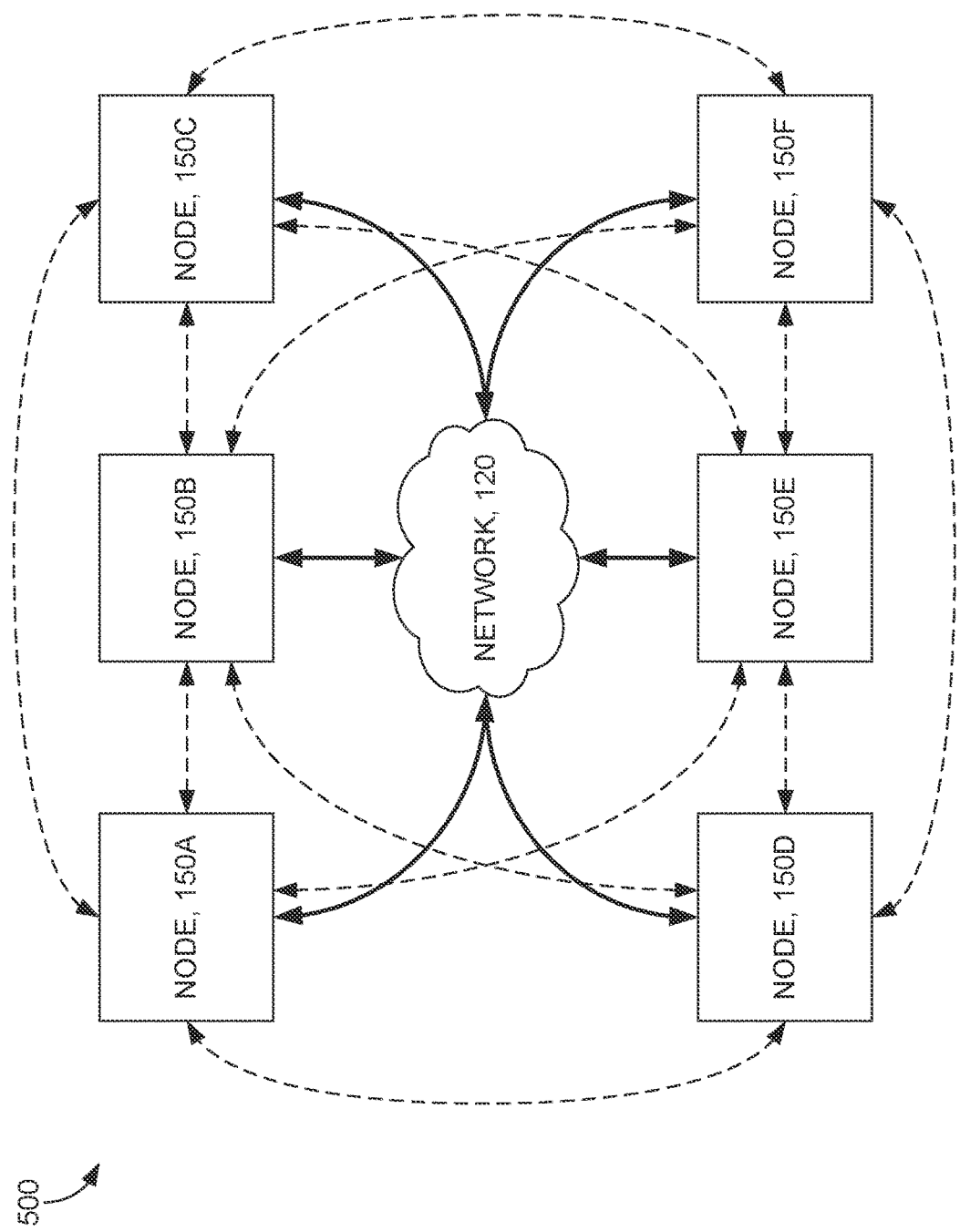
FIG. 5 is an exemplary system diagram of a distributed ledger network in accordance with some embodiments of the present invention.
Figure 6:
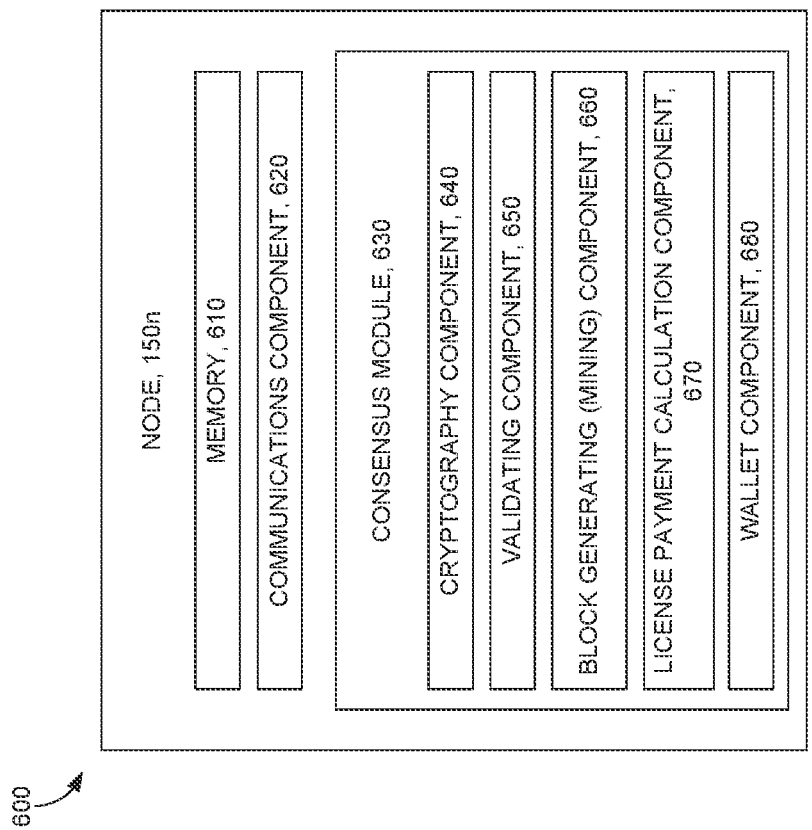
FIG. 6 is a block diagram depicting an exemplary node of a distributed ledger network in accordance with some embodiments of the present invention.

Turning now to FIG. 5 in view of FIG. 6, a schematic depiction is provided illustrating an example of distributed ledger network 500 in which some embodiments of the present invention may be employed. The distributed ledger network 500 depicted in FIG. 5, described in accordance with the distributed ledger network 500 depicted in FIG. 1, includes a plurality of nodes 150A-150F that are each in communication with one or more other nodes 150A-150F over a network, such as the Internet. In some embodiments, nodes 150A-150F can include a license payment dispersing component 510 for receiving a license fee payment for a licensable asset, and dispersing one or more portion(s) of the received license fee payment to corresponding licensor(s) associated with the licensable asset and any other licensable assets incorporated therein. In various embodiments, the license payment dispersing component 510 can interpret a smart contract, addressed by a payment transaction including a license fee payment, to properly disperse any portion of the paid license fee to licensor(s) that are due a license fee for their contribution to the licensable asset for which the license fee was paid. In some embodiments, the license payment dispersing component 510 of any node, such as node 150A, can determine that a payment transaction addressed to a smart contract associated with a licensable asset is received by the node. The license payment dispersing component 510 can determine that the received payment transaction corresponds to a base license fee defined in the smart contract associated with the licensable asset. Based on the determination that the received payment transaction corresponds to the defined base license fee, the license payment dispersing component 510 can determine one or more percentages or portions of the received payment transaction that should be redirected to corresponding licensors of licensable assets incorporated in the licensable asset. Each percentage or portion to be redirected to other licensors can be calculated by license payment dispersing component 510 based on the defined base license fee and the determined ratio(s) of contribution defined in the smart contract, or based on calculated license fees that were already defined in the smart contract based on the ratio(s) of contribution determined when the smart contract was generated. The license payment dispersing component 510 can also reference licensor payment addresses, defined in the smart contract, and corresponding to each incorporated licensable asset so that appropriate shares (e.g., percentages or portions) of the received payment transaction can be dispersed accordingly.

Turning now to FIG. 6, a block diagram 600 is provided depicting an exemplary node 150*n* of a distributed ledger network, such as distributed ledger network 500 of FIG. 5, in accordance with some embodiments of the present disclosure. The node 150*n* depicted in FIG. 6 can include, among other things, a memory 610 for storing received transactions and the distributed ledger, a communications component 620 for communicating with other nodes or one or more computing devices (e.g., client 130, digital asset server 140, license payment determination server 110 of FIG. 1), and a consensus module 630 for verifying transactions and verifying the distributed ledger with other nodes 150*n* of the distributed ledger network 500.

The consensus module 630 can include any number of components or subcomponents that, together with the memory 610 and communications component 620, enable the node 150*n* to operate as a peer with other nodes in a distributed ledger network, such as distributed ledger network 500 described in accordance with FIG. 1. In some embodiments, the consensus module includes a cryptography component 640 that employs aspects of asymmetric cryptography (such as public-private key cryptography) to digitally authenticate transactions sent to the node or digitally sign transactions sent from the node. The consensus module 630 can also include a validating component 650 for determining that a transaction communicated thereto is valid and authentic. A transaction, such as one including a payment of a license fee, can be validated by determining that the sender of the transaction has sufficient balance to send the transaction (e.g., the license fee payment). A transaction, sent from an address of the sender (e.g., a licensee), can also be authenticated by determining that the transaction is digitally signed with a private key associated with the sender's address.

In some embodiments, a consensus module 630 can also include a block generating component 660. The block generating component 660 can group validated transactions into a block of transactions, each of which is cryptographically linked to a previously-generated block of grouped and validated transactions. As the aforementioned processes for block generation are generally known in the art, additional detail for such processes are not described herein. It is contemplated, however, that any implementation of block generation and consensus determination can be employed in accordance with the present disclosure.

In some embodiments, consensus module 630 can include a license payment dispersing component 670. The license payment dispersing component 670 can execute functions or operations defined in a smart contract associated with a licensable asset stored on an asset server, such as digital asset server 140 of FIG. 1. For example, a smart contract associated with a stored licensable asset can include one or more defined fields, such as a licensable asset identifier associated with the licensable asset, a licensable asset identifier associated with any other licensable asset incorporated into the licensable asset, a base licensing fee, a calculated licensing fee corresponding to any other incorporated licensable asset, a ratio of contribution determined for any other incorporated licensable asset, a licensor payment address associated with the licensable asset and any other incorporated licensable asset, among other things. As each node 150*n* of a distributed ledger network includes common components and maintains a common copy of the distributed ledger, each node can commonly execute the functions or operations defined in the smart contract.

In various embodiments, each smart contract associated with a licensable asset stored on asset server is associated with a smart contract address, which can be utilized as a payment receiving address for receiving license fee payment transactions via the distributed ledger. A node 150*n* can receive a payment transaction that is addressed to a smart contract address, such as one that is associated with a stored licensable asset. Employing license payment dispersing component 670, the node 150*n* can determine that the received payment transaction is addressed to the smart contract address, and that a set of compiled operations stored on the distributed ledger in association with the smart contract address is to be executed based on the received payment transaction and/or the set of compiled operations.

In some embodiments, the license payment dispersing component 670 can execute the operations defined by the smart contract based on received transactions that reference the smart contract. For example, a transaction generated by a client device, such as client device 130 of FIG. 1, can include a payment for a base license fee defined in the smart contract. The smart contract can be defined to include a licensor's wallet address associated with the licensable asset identifier. In some aspects, additional wallet addresses associated with other licensors can be also defined in the smart contract, particularly if other licensable assets are included in the licensable asset.

The license payment dispersing component 670 can determine that an amount of the received payment transaction corresponds to the based license fee defined in the smart contract. In other words, a license fee required to license the associated licensable asset can be determined included in the received payment transaction. In some aspects, if the required base license fee is not included in the received payment transaction, the received payment transaction can either be reversed and sent back to a sending address off the paying party (e.g., a licensee) or the received payment transaction can be locked by the smart contract until a remaining balance of the required license fee is sent from the sending address to the smart contract. Based on a determination that the base license fee is included in the received payment transaction addressed to the smart contract, license payment dispersing component 670 can disperse one or more portions of the received payment transaction (i.e., the paid license fee included therein) to one or more addresses of licensors defined in the smart contract. In some embodiments, each dispersed portion of the received payment transaction can correspond to a percentage or ratio of contribution determined for each licensable asset incorporated into the licensable asset for which the payment transaction was received. As described herein, each determined ratio of contribution for incorporated licensable assets can be defined in a smart contract associated with a licensable asset having the other licensable assets incorporated therein. A determined ratio of contribution can be defined as a value, percentage, ratio, or even a set value or license fee calculated based on the determined ratio of contribution and/or the base license fee associated with the licensable asset.

In some embodiments, the consensus module 630 can include a wallet component 680. In some aspects, the wallet component 680 can securely store a private key of a user. Typically, the wallet component 680 is included when a computing device, such as client device 130 of FIG. 1 or 3, is also operating as a node of the distributed ledger network, such as nodes 150*n* of FIG. 6. Among other things, the wallet component 680 can parse, from a locally-stored copy of the distributed ledger, one or more transactions associated with a public key associated with the stored private key, so that only those transactions that are addressed from or to the public key are provided for display. The wallet component 680 is generally associated with a GUI that provides the user with a list of relevant transactions. The wallet component 680 can receive inputs from a user to generate transactions, and can sign those transactions with the stored private key. It can also provide the user with updates regarding a transaction status via the GUI. Additionally, in some embodiments, the wallet component can be coupled with an asset editing application or service provided by the client device. In this regard, the wallet component 680 can further parse the distributed ledger to identify transactions or records that reference creative work identifiers associated with creative works generated on the client device, or licensable asset identifiers incorporated into generated creative works. In this way, the wallet component 680 can be employed to detect when a license fee for a licensable asset that was incorporated into a generated creative work is calculated and available for viewing (i.e., stored on the distributed ledger), to detect when a license fee for the generated creative work is paid by a licensee, to detect that portion(s) of a paid license fee is dispersed to other licensors of incorporated licensable assets, or any variation thereof in accordance with various embodiments described herein.

Figure 7:
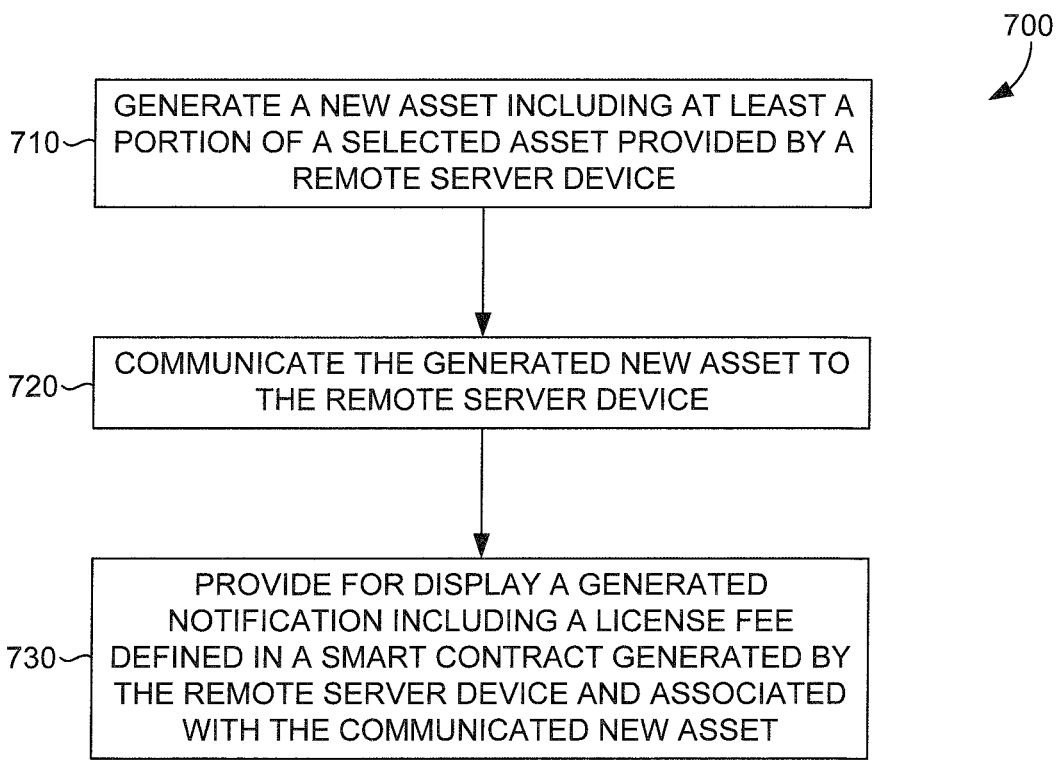
FIG. 7 is a block diagram depicting an exemplary method for licensing assets incorporated into creative works in accordance with some embodiments of the present invention.

Turning now to FIG. 7, a flow diagram is provided that illustrates a method 700 for licensing creative works, in accordance with embodiments described herein. At step 710, a new asset (i.e., creative work) is generated including at least a portion of a selected licensable asset that was provided by a remote server device, such as digital asset server 140 of FIG. 1. At step 720, the generated creative work is communicated to the remote server device. Among other things, when communicating the generated creative work, a client device can also communicate metadata associated with the generated creative work, licensable asset identifiers associated with other licensable assets (i.e., selected licensable assets) incorporated into the generated creative work, and/or a base license fee for other users (e.g., licensees) to license the creative work, any of which can be defined by the user via the client device.

In various embodiments, the asset server can relay or further communicate the creative work and any other associated metadata, received from the client device, to a license payment determination server, such as license payment determination server 110 of FIG. 1. In some aspects, the asset server and the license payment determination server can be the same server. The license payment determination server can analyze the creative work and determine one or more ratios of contribution, each ratio of contribution being determined for one of a set of licensable asset(s) incorporated in the creative work based on the licensable asset's relative contribution to the creative work and/or an amount of the creative work that should be attributed to the licensable asset. The license payment determination server can generate, for the creative work, an associated smart contract that can be stored to a distributed ledger maintained by a plurality of nodes in a distributed ledger network, such as nodes 150n of FIG. 1.

In some embodiments, at step 730, a notification is provided for display including a license fee defined in a smart contract generated by the remote server device and associated with the communicated new asset. The client device can monitor the distributed ledger to detect transactions that reference the creative work, whether through associated metadata or a generated hash of the creative work employable to identify the creative work, to alert a user of the client device that a license fee has been calculated and is available for licensing the incorporated licensable asset. The user can be alerted via a notification that is generated and provide for display by the client device based on the detected transactions. In some further embodiments, the client device can detect a smart contract that references the creative work, such that the smart contract including either a calculated license fee for the incorporated licensable asset or a base license fee for the licensable asset and a determined ratio of contribution for the incorporated licensable asset can be extracted from the smart contract. The client device can calculate the license fee for the incorporated licensable asset from the extracted base license fee and the determined ratio of contribution, or extract the calculated license fee from the smart contract, and provide the calculated license fee for display via a generated notification. In this way, the client device can present the generated notification to alert the user that a license fee has been calculated for licensing the incorporated licensable asset included in the generated creative work.

Figure 8:
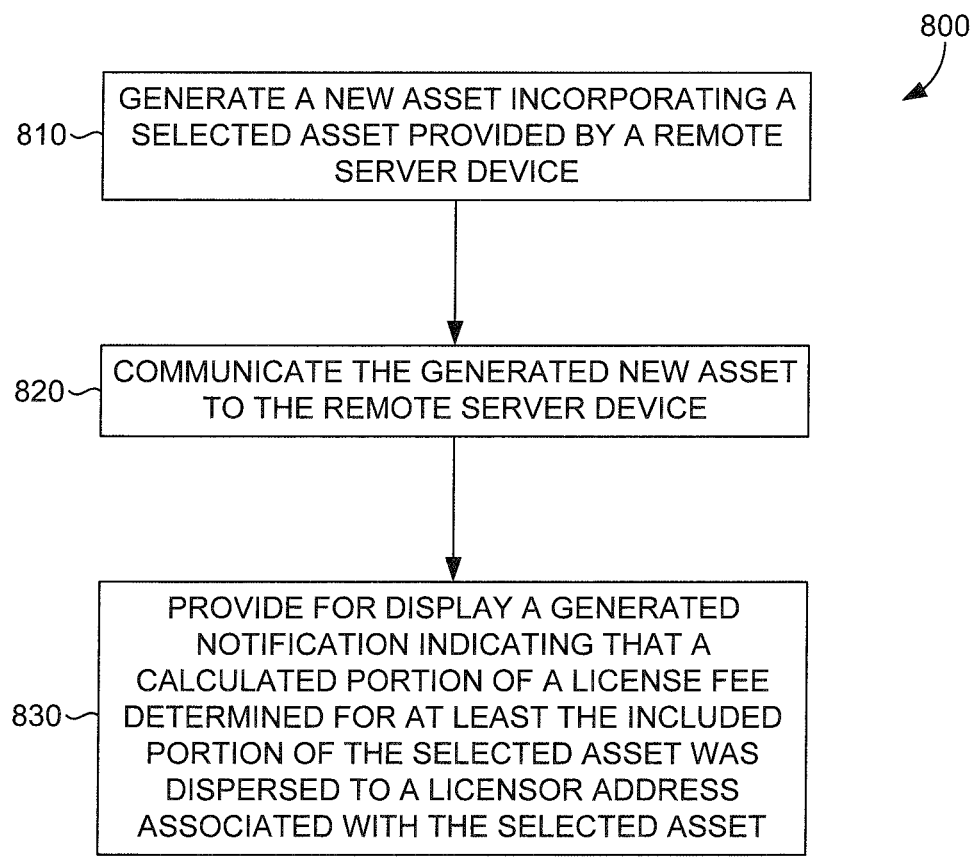
FIG. 8 is a block diagram depicting another exemplary method for licensing assets incorporated into creative works in accordance with some embodiments of the present invention.

With reference to FIG. 8, a flow diagram is provided that illustrates another method 800 for licensing creative works in accordance with some embodiments described herein. At step 810, a client device, such as client device 130 of FIG. 1, generates a new asset (i.e., creative work) including at least a portion of a selected licensable asset downloaded from a remote server device, such as digital asset server 140 of FIG. 1. At step 820, the generated new asset is communicated to the remote server device. For example, the client device can publish the generated creative work, whereby the client device communicates the generated creative work to the asset server for storage. Among other things, when communicating the generated creative work, the client device can also communicate metadata associated with the generated creative work, licensable asset identifiers associated with licensable assets (i.e., selected licensable assets) incorporated into the generated creative work, and/or a base license fee for other users (e.g., licensees) to license the creative work, any of which can be defined by the user via the client device.

In various embodiments, the asset server can relay or further communicate the creative work, any other associated metadata, the base license fee, and/or licensable asset identifiers, received from the client device, to a license payment determination server, such as license payment determination server 110 of FIG. 1. The license payment determination server can compare the creative work to one or more licensable assets retrieved from the asset server based on the licensable asset identifiers, to determine one or more ratios of contribution, each ratio of contribution being determined for one of a set of licensable asset(s) incorporated in the creative work. In various embodiments, a ratio of contribution can be determined based on an incorporated licensable asset's relative contribution to the creative work and/or an amount of the creative work that should be attributed to the incorporated licensable asset. The license payment determination server can generate, for the creative work, an associated smart contract that can be stored to a distributed ledger maintained by a plurality of nodes in a distributed ledger network, such as nodes 150n of FIG. 1. In various embodiments, the associated smart contract can be employed by the plurality of nodes to disperse one or more portions of license fee payments included in received payment transactions, addressed to the smart contract, to each licensor or licensor address associated with the other licensable assets incorporated into the creative work associated with the smart contract. Each licensor or licensor addresses can be defined in the smart contract in association with either a defined license fee amount or a determined ratio of contribution, such that the nodes can determine how much of a license fee payment should be dispersed to each licensor or licensor address.

In some embodiments, at step 830, a generated notification indicating that a calculated portion of a licensee fee is provided for display. The license fee can be determine, for at least the included portion of the selected asset, that was dispersed to a licensor address associated with the selected asset. For example, the client device can monitor the distributed ledger to detect transactions that reference the creative work, whether through associated metadata or a generated hash of the creative work employable to identify the creative work, to alert a user of the client device that a license fee payment has been received for the creative work generated by the user via the client device. The user can be alerted via a notification that is generated and provide for display by the client device based on the detected transactions. In some further embodiments, the client device can detect that the associated smart contract referencing the creative work has been executed by the nodes, or that the associated smart contract has generated one or more payment transactions to each licensor defined in the smart contract. The client device can parse each payment transaction generated by the associated smart contract to provide for display, in a notification generated by the client device, an indication that a portion of the license fee payment was dispersed to the user or an address of the user, and that one or more other portions of the license fee payment was dispersed to other licensors or addresses of the licensors associated with licensable assets incorporated into the creative work.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 9:
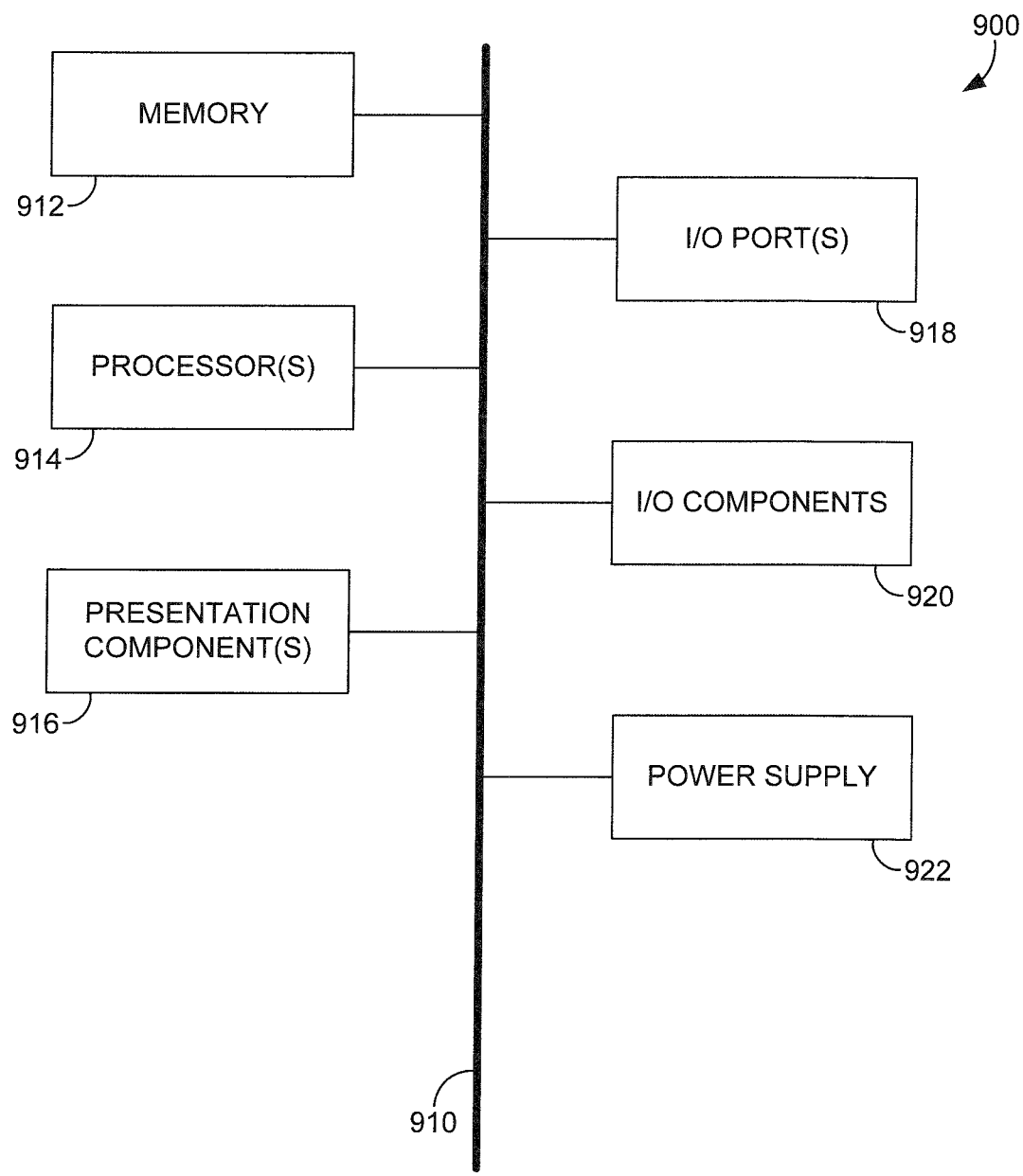
FIG. 9 is a block diagram depicting an exemplary computing environment suitable for use in implementing some embodiments of the present invention.

With reference to FIG. 9, computing device 900 includes a bus 910 that directly or indirectly couples the following devices: memory 912, one or more processors 914, one or more presentation components 916, input/output (I/O) ports 918, input/output components 920, and an illustrative power supply 922. Bus 910 represents what can be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, and removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise transitory signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile memory, nonvolatile memory, or a combination thereof. The memory can be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which can be built in. Illustrative components include a microphone, joystick, game pad, satellite dish, scanner, printer, wireless device, etc. The I/O components 920 can provide a natural user interface (NUI) that processes air gestures, voice, or other physiological inputs generated by a user. In some instances, inputs can be transmitted to an appropriate network element for further processing. An NUI can implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 can be equipped with depth cameras, such as stereoscopic camera systems, infrared camera systems, RGB camera systems, touchscreen technology, and combinations of these, for gesture detection and recognition. Additionally, the computing device 900 can be equipped with accelerometers or gyroscopes that enable detection of motion. The output of the accelerometers or gyroscopes can be provided to the display of the computing device 900 to render immersive augmented reality or virtual reality.

As can be understood, embodiments of the present invention provide for, among other things, the licensing of creative works or other licensable assets incorporated into creative works. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

What is claimed is:

1. A computer-implemented method for licensing digital assets incorporated into creative works, comprising:
   responsive to detecting a publication request for a new asset that includes at least a licensable asset selected from a plurality of licensable assets provided by a remote server device, generating a first smart contract corresponding to the new asset, the generated first smart contract defining at least a first license fee that is calculated based on a ratio of contribution determined based on comparing the new asset and the licensable asset using hashes generated for each of the new asset to the licensable asset, and a second license fee defined in a second smart contract stored on a distributed ledger and associated with the selected licensable asset;
   communicating the generated first smart contract to a node maintaining an instance of the distributed ledger; and
   providing for display, by a computing device, a generated notification that includes the first license fee based on a determination that the generated first smart contract is stored on the distributed ledger.

2. The computer-implemented method of claim 1, wherein the first smart contract includes a new asset identifier, and the generated notification is provided for display based on the determination that the generated first smart contract includes the new asset identifier.

3. The computer-implemented method of claim 2, the new asset identifier including a determined hash of the generated new asset.

4. The computer-implemented method of claim 1, wherein the hashes generated for each of the new asset and the licensable asset are perceptual hashes (pHashes).

5. The computer-implemented method of claim 1, wherein the node is included within a plurality of nodes configured to store the first smart contract on the distributed ledger.

6. The computer-implemented method of claim 1, further comprising generating a hash for one or more portions of the new asset, wherein the hash is utilized when comparing the hashes for each of the new asset to the licensable asset.

7. A computer-implemented method for licensing digital assets incorporated into creative works, comprising:
   generating, by a computing device, a new asset that includes at least a portion of a licensable asset selected from a plurality of licensable assets provided by a remote server;
   communicating, by the computing device, the generated new asset to the remote server, wherein the remote server is configured to generate a first smart contract associated with the new asset for storage on a distributed ledger, the generated first smart contract defining at least a first license fee that is calculated based on a ratio of contribution determined based on comparing the new asset and the licensable asset using hashes generated for each of the new asset to the licensable asset, and a second license fee defined in a generated second smart contract stored on the distributed ledger and associated with the licensable asset; and
   providing for display, by the computing device, a generated notification that includes the first license fee based on a determination that the generated first smart contract is stored on the distributed ledger.

8. The computer-implemented method of claim 7, wherein the first smart contract includes a new asset identifier, and the generated notification is provided for display based on the determination that the generated first smart contract includes the new asset identifier.

9. The computer-implemented method of claim 8, the new asset identifier including a determined hash of the generated new asset.

10. The computer-implemented method of claim 7, wherein the hashes generated for each of the new asset and the licensable asset are perceptual hashes (pHashes).

11. The computer-implemented method of claim 7, wherein the distributed ledger is maintained by at least a node of a plurality of nodes.

12. The computer-implemented method of claim 11, further comprising generating a transaction to authorize payment of the first license fee included in the generated notification, wherein the generated transaction is communicated to the plurality of nodes configured to store the transaction on the distributed ledger.

13. A non-transitory computer storage medium storing computer-useable instructions that, when used by at least one computing device, cause the at least one computing device to perform operations comprising:
   generating a smart contract corresponding to a new asset, the generated first smart contract defining at least a first license fee that is calculated based on a ratio of contribution determined based on comparing the new asset and a licensable asset using hashes generated for the new asset and the licensable asset, and a second license fee defined in a second smart contract stored on a distributed ledger and associated with the licensable asset, wherein the new asset comprises at least a portion of the licensable asset;
   communicating the smart contract to a node maintaining an instance of the distributed ledger; and
   providing for display a generated notification that includes the first license fee in response to a determination that the smart contract is stored on the distributed ledger.

14. The non-transitory computer storage medium of claim 13, wherein the smart contract is executed based further on the received license payment transactions being addressed to the stored smart contract.

15. The non-transitory computer storage medium of claim 14, wherein execution of the smart contract causes the node to disperse a calculated portion of a license payment transaction to an address included in the distributed ledger.

16. The non-transitory computer storage medium of claim 13, wherein the smart contract includes a new asset identifier, and the generated notification is provided for display based on the determination that the smart contract includes the new asset identifier.

17. The non-transitory computer storage medium of claim 13, the generated notification further indicating that another calculated portion of the received license payment transaction was dispersed to another licensor address associated with the generated new asset.

18. The non-transitory computer storage medium of claim 13, wherein the other licensor address is further associated with an author of the generated new asset.

19. The non-transitory computer storage medium of claim 13, wherein the hashes generated for each of the new asset and the licensable asset are perceptual hashes (pHashes).

20. The non-transitory computer storage medium of claim 13, wherein the generated smart contract includes computer executable instructions to disperse the received license payment transactions based on the determination that the received license payment transactions correspond to a base license fee defined in the stored smart contract.

* * * * *